(12) United States Patent
Siikaluoma et al.

(10) Patent No.: US 7,213,534 B2
(45) Date of Patent: May 8, 2007

(54) DEVICE AND METHOD FOR DETECTION/INDICATION OF LIQUID LEAKAGE

(75) Inventors: Timo Siikaluoma, Stockholm (SE); Tom Hörlin, deceased, late of Hankasalmi (FI); by Emil Oskar Hörlin, legal representative, Kista (SE); by Hanna Sofia Hörlin, legal representative, Kista (SE)

(73) Assignee: Tom Invent AB, Stockholm (SE)

( * ) Notice: Subject to any disclaimer, the term of this patent is extended or adjusted under 35 U.S.C. 154(b) by 42 days.

(21) Appl. No.: 10/504,478

(22) PCT Filed: Feb. 10, 2003

(86) PCT No.: PCT/SE03/00218

§ 371 (c)(1),
(2), (4) Date: Mar. 24, 2005

(87) PCT Pub. No.: WO03/069298

PCT Pub. Date: Aug. 21, 2003

(65) Prior Publication Data

US 2005/0160963 A1     Jul. 28, 2005

(30) Foreign Application Priority Data

Feb. 12, 2002   (SE) ................................ 0200399

(51) Int. Cl.
*G01D 21/00*   (2006.01)
(52) U.S. Cl. ............... 116/206; 116/200; 116/DIG. 14; 252/964; 436/3
(58) Field of Classification Search ............... 116/206, 116/200, 227, 264, DIG. 14; 252/963, 964; 436/3, 164; 422/58, 61
See application file for complete search history.

(56) References Cited

U.S. PATENT DOCUMENTS 2,278,673 A * 4/1942 Savada et al. ............. 428/42.3

(Continued)

FOREIGN PATENT DOCUMENTS

DE             41 05 044          8/1992

(Continued)

*Primary Examiner*—Richard Smith
*Assistant Examiner*—Amy R. Cohen
(74) *Attorney, Agent, or Firm*—Young & Thompson

(57) ABSTRACT

An improved device for the detection of leakage is achieved when the device includes at least two components, of which at least one is capable of migrating with the liquid within the carrier, and forming a distinct color or other detectable signal with the first component. Such device is not sensitive to normal, ambient humidity and the color signal formed is resistant to being diluted or rinsed away in cases of abundant or repeated leakage.

8 Claims, 3 Drawing Sheets

(a)

(b)

(c)

U.S. PATENT DOCUMENTS

| | | | |
|---|---|---|---|
| 2,601,840 A | 7/1952 | Smith et al. | |
| 2,975,091 A * | 3/1961 | Tobey | 428/57 |
| 3,485,085 A | 12/1969 | Hawkins, Jr. | |
| 3,502,436 A * | 3/1970 | Hoover et al. | 422/56 |
| 3,597,263 A * | 8/1971 | Bancroft et al. | 422/56 |
| 4,028,876 A * | 6/1977 | Delatorre | 368/89 |
| 4,150,570 A * | 4/1979 | Fuller | 73/335.01 |
| 4,184,445 A * | 1/1980 | Burrows | 116/206 |
| 4,746,616 A * | 5/1988 | Honigs et al. | 436/20 |
| 4,895,567 A * | 1/1990 | Colon et al. | 604/361 |
| 4,931,051 A * | 6/1990 | Castello | 604/361 |
| 6,128,947 A | 10/2000 | Anderson, Sr. | |
| 6,238,623 B1 * | 5/2001 | Amhof et al. | 422/58 |
| 6,772,708 B2 * | 8/2004 | Klofta et al. | 116/206 |

FOREIGN PATENT DOCUMENTS

| | | |
|---|---|---|
| GB | 2 307 558 | 5/1997 |
| JP | 61-250535 | 11/1986 |
| WO | 94/02772 | 2/1994 |

* cited by examiner (a)

(b)

(c)

DEVICE AND METHOD FOR DETECTION/INDICATION OF LIQUID LEAKAGE

TECHNICAL FIELD

The present invention concerns a device and a method for the detection and/or indication of liquid leakage, sensitive already to droplets and small amounts of liquids.

BACKGROUND OF THE INVENTION

The leakage of liquids, and in particular stealthy leakage, can occur in apartments and houses, as well as in other real estate and cause serious damage, requiring expensive reparations. It is not unusual that minor leaks occur in or around valves in both old and modern hot water radiators when the liquid flow is adjusted, or when the radiator is aired that is the top valve is opened in order to remove entrapped air. Leakages in pipe joints, couplings and fittings for example to household appliances, such as dish washers and washing machines, may be difficult to detect, in particular when built in or hidden.

A leak can take the form of drops, droplets, or a fine spray or mist of liquids. A leak can also occur in the form of a liquid film, spreading along a pipe. Even the condensation of liquid on a cold water pipe can cause damage. It frequently happens that such minor leaks/condensation is not discovered until the secondary damage becomes apparent. At that stage, the extent of reparations necessary will also become greater and thus more expensive.

Various devices for the detection of leakage are known. U.S. Pat. No. 6,128,947 describes a gasket or apron having a colorant-emitting disc attached thereto, the colorant in said disc being released by contact with water. This disc is however intended to be permanently mounted under a toilet, and cannot be held to be easily installed or removed.

DE 4 105 044 describes a method for testing the leak-tightness of a pipe, either by holding the pipe at a slight vacuum or over-pressure and detecting changes in this vacuum or pressure, or by observing a pigment layer surrounding the pipe, which pigment reacts with an indicator substance emitted from said pipe.

U.S. Pat. No. 3,485,085 describes a method for detecting leaks in the cooling system of a power reactor, wherein an apertured container is placed around a point where leakage may occur, and a tape whose resistivity changes on exposure to moisture is placed over the aperture of said container, and changes in the resistivity determined.

GB 2307558 describes a thin covering to be applied to pipe lines conveying a liquid medium, such as for example fuel, wherein said covering consists of a material which reacts in a chemical-physical manner with the liquid, producing a colour change.

U.S. Pat. No. 2,601,840 describes a leakage indicating cover for pipe flanges and valves, wherein said cover has a fabric lining impregnated with a chemical which changes colour when contacted by an acid or base. Among the examples mentioned are thymol blue, methyl red, phenolphthalein and litmus.

WO 94/02772 describes a method for leak detection where a film of colour change material is formed on the outer surface of a liquid-carrying hose, where the material will react with possible escaping liquid to provide a visible indication. The colour change material is completely encapsulated in a protective film, and preferably applied to the hose by spraying.

JP 61250535 describes a tape for detecting leakage of water, wherein said tape is printed, coated or impregnated with a water-soluble colouring material, which becomes blotted upon contact with water.

Regardless of the considerable amount of prior art in this field, it appears that there still remains a need for a simple, inexpensive and easily applicable device, as well as a simple and reliable method for the detection of minute amounts of liquid or stealthy leakage. One objective of the present invention is to make available such a device, which is easily placed at the site of a suspected leak, easily removed and replaced. Another objective is to ensure that the device and method are reliable also when the leakage is abundant, i.e. that the indicator substance is not rinsed away or diluted to an extent that the colour indicating leakage becomes unrecognisable.

A further objective is that the device and method are not influenced by ambient humidity. Further objectives and the corresponding features of the invention, as well as the advantages thereof, will become apparent to a skilled person upon a closer study of the description and examples.

SUMMARY OF THE INVENTION

The above objectives are met by a device comprising a carrier permeable to said liquid, and at least two components, whereof at least one is capable of migrating within the carrier when the carrier is wetted by said liquid, the components or parts thereof forming a coloured complex, which coloured complex is not diluted or significantly changed by a surplus of said liquid, or which remains immobilised to the carrier.

The invention is further defined in the attached claims, incorporated herein by reference.

SHORT DESCRIPTION OF THE DRAWINGS

The present invention will be described in closer detail below, in the description, examples and claims, with reference to the attached figures in which:

DESCRIPTION

Figure 1:
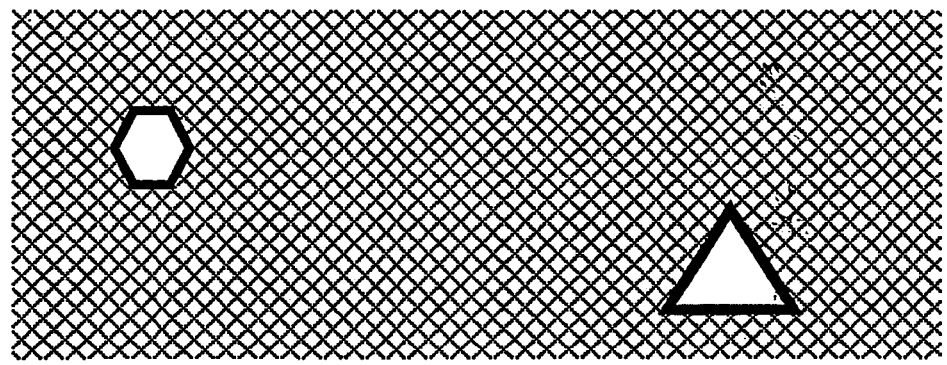
FIG. 1 shows (a) how two components are present in the carrier material; (b) how the presence of a liquid dislocates or dissolves, either entirely or partially, both components, bringing them together forming a coloured complex; and (c) how the coloured complex is visible whereas none or only minor amounts of the components remain.
Figure 1:
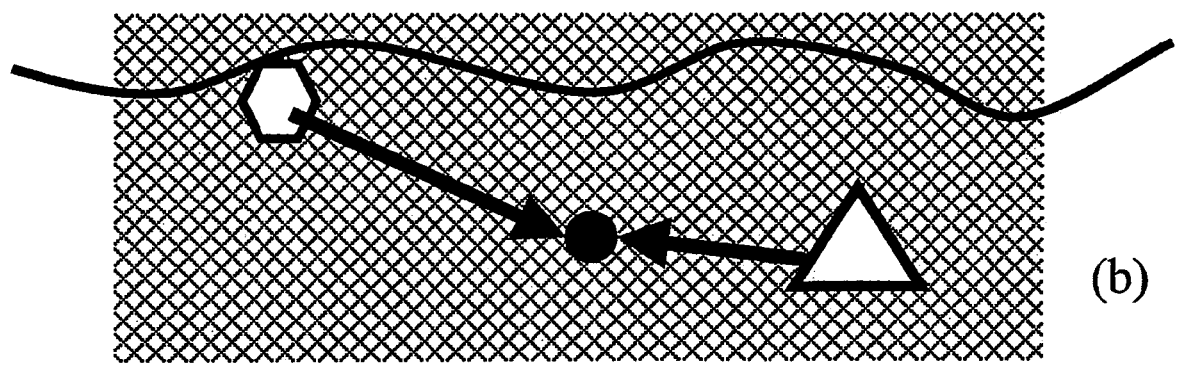
Figure 1:
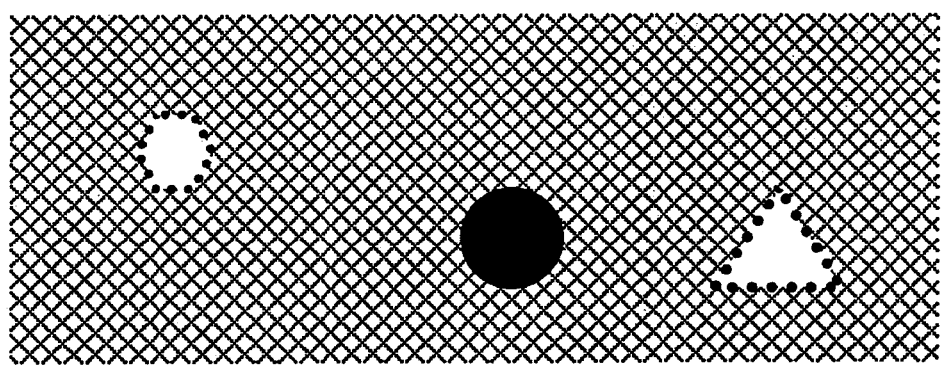

In the context of the present invention, the term "liquid" encompasses both aqueous liquids and non-aqueous liquids, such as water, solvents, fuels, heat-transfer solutions etc.

The terms "component" and "components" are here used to define the components in a couple of at least two compounds, distributed in the carrier, which are capable of reacting with each other in the presence of a liquid, and forming a detectable, stable reaction product. The term "stable" means that the reaction product is non-soluble in said liquid. The term "detectable" means that the reaction product has a property, e.g. a colour, which is detectable, preferably detectable by the unaided eye. Alternatively, the colour is detectable or accentuated when subjected to light of a certain wavelength, e.g. ultraviolet light.

The terms "carrier" and "carrier material" are here used to define a porous material which is wettable by the liquid to be detected, and capable of retaining and presenting a detectable, stable reaction product. The exact structure composition and colour of the carrier depend on product. If the reaction product is a coloured complex, the carrier preferably has a light or neutral colour, and most preferably a colour aiding in the identification of the coloured complex. Further, the combination of carrier material and components should be such that said coloured complex is detectable regardless if the carrier is wet or dry, that is penetrated by the liquid or not.

The carrier material can be a more or less structured fibrous material. Examples include paper, which is here held to represent a less structured fibrous material, and thread, yarn, braided threads or yarns, cloth, tissue or fabric, the latter being held to represent a more structured fibrous material. Examples of fibres include natural fibres, such as cellulose and mineral fibres, and synthetic fibres, such as polymer fibres. The main concern is that the carrier can be wetted or penetrated by the liquid to be detected, and that diffusion of said liquid within the material is possible.

The carrier can also be in the form of a foamlike material, or a gel, provided that said foam or gel is suitable for application, that is fulfils the necessary physical requirements, and is sufficiently porous to the liquid to be detected.

Said physical requirements mean that the carrier should be capable of being attached to the site where leaks are to be detected, for example below a valve, around a pipe etc. When the carrier material is a foamlike material or a gel, it is conceived that it is further reinforced with fibers.

When the resulting reaction product, the coloured complex, although it is non-soluble in the liquid to be detected, may be prone to move within the carrier through the action of said liquid. This may in particular be the case when the coloured complex forms very small particles, for example a sol or a colloidal solution. A particular aspect of the invention is thus the use of a more dense fibrous or porous structure, or the combination of a dense structure and an immobilising agent.

Another aspect of the invention is that the physical dislocation of the components from the carrier is prevented through the use of a substance, which immobilises at least one of the components and the resulting reaction product in the carrier. One example of such substance are suitable glues, another example is the use of a gel-forming agent in the carrier.

One aspect of the invention is an improved method and device for the detection of leakage, which is achieved when a device is used, said device comprising at least two components, the first of which is immobilised in a carrier, while the second migrates with the liquid and forms a distinct colour or other detectable signal with said first component Such device is not sensitive to normal, ambient humidity and signal formed is resistant to being diluted or rinsed away in cases of abundant or repeated leakage.

When selecting the components, it is preferred that they fulfil the following requirements:

Primarily only fluids in liquid form are detected. Ambient humidity does not result in the formation of a coloured complex.

The coloured complex is stable and does preferably neither fade nor dissociate in light or in dryness.

The coloured complex is preferably non-soluble in the liquid to be detected.

The toxicity of the components should be sufficiently low, considering the concentrations used, that the device does not constitute a health hazard, in particular to children or pets.

A non-stoichiometric mixture of the components is preferred, when applicable.

The un-reacted components as such are preferably non-coloured or have only little colour, or a colour which can be masked or neutralised by the colour of the carrier.

Figure 2:
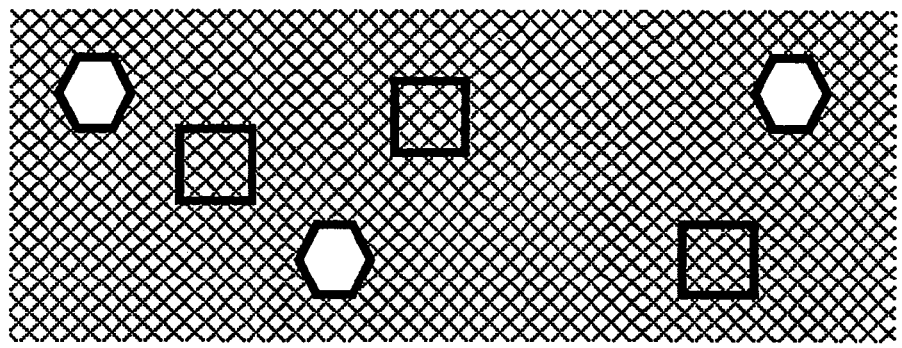
FIG. 2 shows (a) how two components are present in the carrier material; (b) how the presence of a liquid dislocates one of the components but not the other; and (c) how a complex is formed, indicating that the carrier has been subjected to a liquid.
Figure 2:
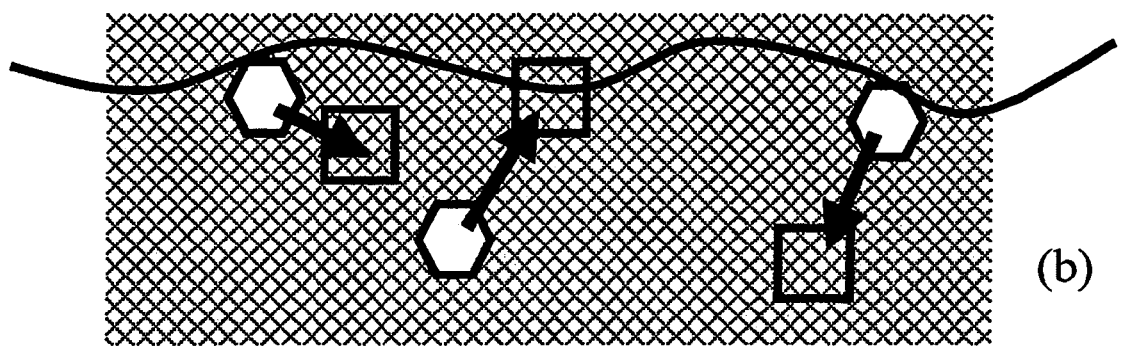
Figure 2:
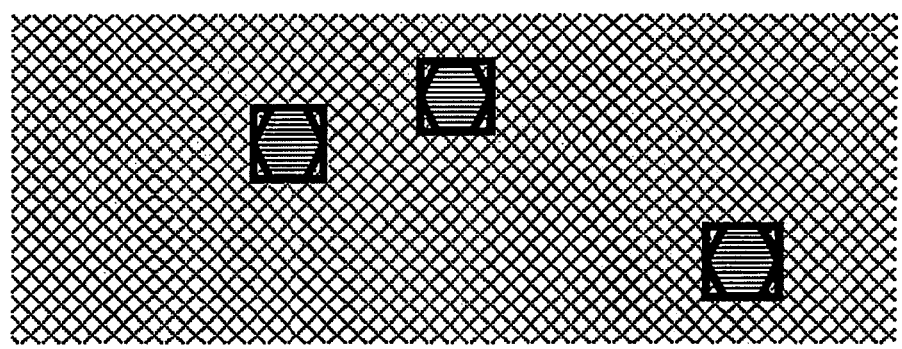
Figure 3:
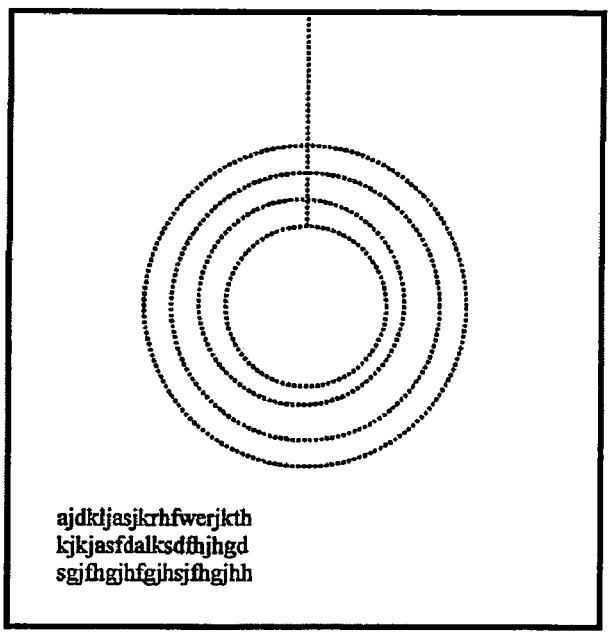
FIG. 3 shows one embodiment of the invention where the device is shaped as a substantially rectangular sheet, having perforations making it suitable for affixing to pipes of different diameter.
Figure 4:
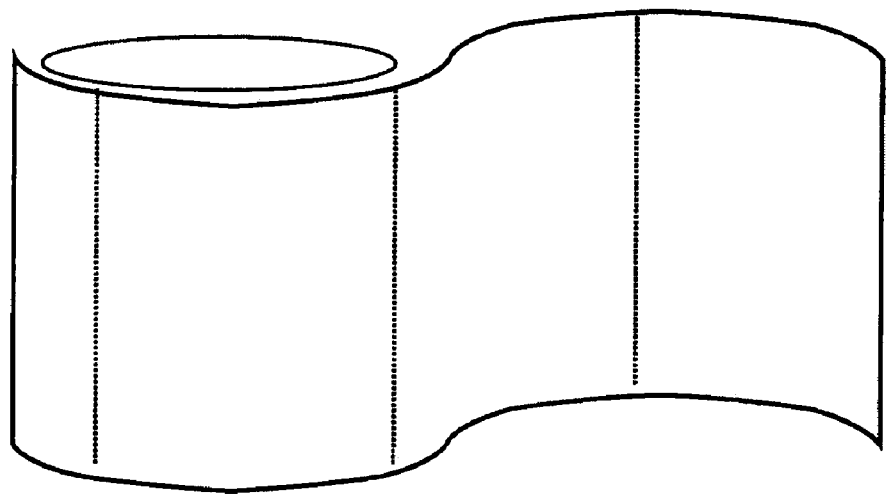
FIG. 4 shows another embodiment, where the device is delivered as a continuous elongated shape, preferably in the form of a roll, where the individual indicator devices are separated by perforations.

According to one embodiment of the invention the device is a substantially rectangular sheet of a carrier material, comprising the necessary components. FIG. 2 shows an embodiment where the device is a substantially two-dimensional sheet optionally carrying printed information, and having cut-outs or preferably concentric perforations making it easily adaptable for use on pipes of different diameter. The device may be cut or punched or delivered in the form of a larger sheet with perforations separating individual devices, or as a tape or band, perforated at regular intervals or possible to cut or tear at desired intervals. FIG. 4 shows an embodiment where the device is delivered in the form of a tape or band, the individual devices separated by perforations.

Further, the device may be delivered in the form of a thread, a yarn, a braid, a band, or a sheet of said porous carrier material. The device may also be delivered in the form of sheets, cut or otherwise adapted by the end-user with respect to the intended place of use.

According to a preferred embodiment, the device is in itself capable of being affixed to a pipe, e.g by being shaped as a cylinder, a spiral or a sheet having an opening. The device may further comprise fastening means, such as threads, elastic bands, metal clips or strips, adhesive patches, tape etc. Said fastening means may either be an integrated part of the device, or supplied separately, and used to affix the device at a desired location. It is conceived that alternative fastening means are supplied with each device, so that the end-user can choose the fastening means best suited for the location.

The method according to the invention is mainly a method for the detection of leaks and in particular stealthy leaks at locations where there is a risk of leaks or unwanted condensation, such as on radiators, heat exchange elements, pipes and pipe joints, valves, couplings and fittings for example to household appliances, such as dish washers and washing machines, regardless if these are permanent or temporary installations. The method according to the invention is suitable both for use in private homes, public spaces, such as office spaces, hospitals and in industry.

The method comprises the steps of affixing a device capable of indicating a liquid, in particular a device as defined in the present description and claims, to a location where leak or condensation could be expected, followed by visual inspection of said device at regular or irregular intervals, wherein a colour signal is taken as an indication that a leak or condensation is taking place or has taken place.

The present invention has a considerable advantage in that the reaction product remains immobilised in the carrier, even if the device would be subjected to an excess of liquid. The inventive device and method have another advantage in that they indicate leaks without being sensitive to ambient humidity, or aggregated humidity. The device is in other words basically maintenance free and reliable. The inventive device mainly detects leaks in the form of drops, droplets or aerosols. The inventive device has an advantage in being simple and easy to use, as well as inexpensive to manufacture. As the device is inexpensive, it becomes possible to use more frequently and with greater coverage, and not only for random tests.

The inventive method and device make it possible to easily detect and indicate leaks already at an early stage, before more serious damage has occurred. The method and device is independent of external energy and safe and easy to use and to read. These features and advantages make the device and method suitable for both professional and private use, which by itself is an additional advantage of the invention. Further features and advantages of the invention will become evident to a skilled person upon study of the description, examples and figures.

EXAMPLE

The device and method will now be presented in the form of an example, said example focussing on simple ionic reactions, as this constitutes a preferred embodiment of the invention, in particular when the device and method is intended for the detection of aqueous liquids. An important consideration in this embodiment is that the transport of the components, necessary for the indicative reaction to start, only takes place when the device is wetted by the liquid to be detected, and that the reaction does not start as long as the device remains dry.

The device according to the invention comprises a porous carrier with particulate grains of the colourless compounds "AB" and "CD". The grains are evenly distributed in the carrier and unable to react with each other as long as the carrier remains dry. In FIG. 1(a) this is illustrated by the hexagonal shape and the triangular shape, symbolizing such grains. When the carrier is wetted, as shown in FIG. 1(b) the compounds are dissolved or dislocated, forming a coloured complex.

In FIG. 2(a) the two components are illustrated by an unfilled square and a filled hexagonal shape, the square symbolizing a component immobilised to the carrier. When the carrier is wetted, as shown in FIG. 2(b) the compounds are dissolved, where applicable, and such compounds not immobilised to the carrier will migrate in the carrier. In FIG. 2(c) the two components have reacted, forming a coloured complex.

According to one embodiment, the components may dissociate into ions as schematically shown below:

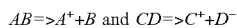

$AB => A^+ + B^-$ and $CD => C^+ + D^-$

The ions may now migrate within the carrier and result in the following reaction:

$A^+ + D^- => AD$ (coloured complex)

Here, AD is preferably a non-soluble or only sparingly soluble complex with a distinct colour which is not diluted or rinsed away even in the presence of a surplus of the liquid to be detected.

In FIGS. 1(b) and (c) this is illustrated by the unfilled squares representing a compound immobilised to the carrier, and the filled hexagonal shapes representing the compound or part of a compound which migrates in the carrier.

It is also possible that a first component is very easily soluble, and that this migrates in the carrier and forms a layer around a second immobilised or more slowly migrating component.

The following components are possible to use when the liquid to be detected is water, an aqueous solution, a polar solution or a weakly polar solution.

Components forming ferro and ferricyanate complexes, as these have strong, distinct colours. Trivalent iron ions result in strong blue colour in ferrocyanate complexes, whereas divalent ions give the same result in ferricyanate complexes. The first alternative is however preferable, as ferrocyanates are both more stable and less toxic than ferricyanates.

One disadvantage of the above components is that the coloured complex may form a colloidal solution, resulting in that the pigment while non-soluble, still may be diluted or rinsed out from the carrier. Measures preventing this must be taken, such as the addition of a gelling substance.

Further examples of components are potassium ferrocyanate ($K_4Fe(CN)_6 \cdot 3H_2O$ and iron phosphate ($FePO_4 \cdot 2H_2O$). These are preferred, as the iron phosphate is rather sparingly soluble in water, resulting in that it will be the ferrocyanate that migrates towards the phosphate, and the coloured complex (blue) will form a layer or shell around the iron phosphate, resulting in a blue/green color.

If a salt of divalent iron ions is used in combination with a ferricyanate, it is preferred that the carrier material of the indicator device holds a surplus of divalent iron ions which then act as an antidote against the more toxic ferricyanate. This is an example of non-stoichiometric proportions of the components, adapted to compensate for their toxic or other properties. This principle is naturally applicable also to other components.

Another preferred reaction is that between divalent cupper ions and ferricyanate. This results in a strong reddish-brown complex of cupper ferrocyanate which appears to be resistant to water. In this case, a surplus of ferrocyanate may be added as an antidote against the toxic cupper ions.

It should be added that it often is sufficient to use very low component concentrations in the carrier in order to achieve distinct colours. The abovementioned non-stoichiometric considerations can then be resorted to as a safety precaution or if required by an official agency, such as the agency for occupational health.

Further, the choice of indicating reaction and consequently the components, is governed by the intended use of the device, including the place of use, the liquid to be detected, and the persons authorized to use the device. It is possible that one set of components become approved for industrial use, whereas another set becomes approved for private use.

Although the invention has been described with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

The invention claimed is:

1. A nontoxic device for detecting leakage of a liquid, comprising:
    a carrier permeable to the liquid;
    at least two components that are soluble in the liquid, the
        components or parts thereof forming a colored complex, which color is not significantly altered or removed by a surplus of the liquid, wherein said at least two components comprise a first component which is immobilised to the carrier and a second component that migrates within the carrier when the carrier is wetted by the liquid, the colored complex being immobilised to the carrier, wherein the first component comprises iron phosphate ($FePO_4 \cdot 2H_2O$) and the second component comprises potassium ferrocyanate ($K_4Fe(CN)_6 \cdot 3H_2O$).

2. Method for the detection of leakage of a liquid at a particular location, comprising providing the device according to claim 1 is placed in said location.

3. A device according to claim 1, wherein the liquid to be detected is water.

4. A device according to claim 1, wherein the carrier is a porous material chosen among paper, thread, yarn, braided threads or yarns, cloth, tissue or fabric, foam materials, and gels.

5. A device according to claim 1, wherein said device has a substantially two dimensional form chosen among a tape, a string, a braid, a ribbon, a strip, and a sheet.

6. A device according to claim 1, wherein said device is shaped as a sheet having concentric perforations for accommodating pipes of different diameters.

7. A device according to claim 1, wherein said device further carries written information.

8. A non-toxic method for detecting leakage of a liquid, comprising the steps of:

providing a carrier permeable to the liquid, the carrier comprising at least two components, the components or parts thereof forming a colored complex, which color is not significantly diluted or removed by a surplus of the liquid;

affixing the carrier to a location where leakage can be expected; and observing the carrier for color changes, wherein said at least two components comprise a first component which is immobilised to the carrier and a second component that migrates within the carrier when the carrier is wetted by said liquid, the colored complex being immobilised to the carrier, wherein the first component comprises iron phosphate ($FePO_4 \cdot 2H_2O$) and the second component comprises potassium ferrocyanate ($K_4Fe(CN)_6 \cdot 3H_2O$).

* * * * *